(12) United States Patent
Yamaoka

(10) Patent No.: US 11,867,253 B2
(45) Date of Patent: Jan. 9, 2024

(54) SHOCK ABSORBER

(71) Applicant: HITACHI AUTOMOTIVE SYSTEMS, LTD., Hitachinaka (JP)

(72) Inventor: Fumiyuki Yamaoka, Sagamihara (JP)

(73) Assignee: HITACHI ASTEMO, LTD., Ibaraki (JP)

(*) Notice: Subject to any disclaimer, the term of this patent is extended or adjusted under 35 U.S.C. 154(b) by 447 days.

(21) Appl. No.: 17/255,119

(22) PCT Filed: Jul. 18, 2019

(86) PCT No.: PCT/JP2019/028226
§ 371 (c)(1),
(2) Date: Dec. 22, 2020

(87) PCT Pub. No.: WO2020/022177
PCT Pub. Date: Jan. 30, 2020

(65) Prior Publication Data
US 2021/0246960 A1    Aug. 12, 2021

(30) Foreign Application Priority Data

Jul. 25, 2018 (JP) .................................. 2018-139411

(51) Int. Cl.
*F16F 9/34* (2006.01)
*F16F 9/36* (2006.01)
(Continued)

(52) U.S. Cl.
CPC .............. *F16F 9/348* (2013.01); *F16F 9/368* (2013.01); *F16F 9/5126* (2013.01); *B60G 13/08* (2013.01);
(Continued)

(58) Field of Classification Search
CPC .......... F16F 9/348; F16F 9/368; F16F 9/5126; F16F 9/061; F16F 2222/12;
(Continued)

(56) References Cited

U.S. PATENT DOCUMENTS 7,322,449 B2 * 1/2008 Yamaguchi ............. F16F 9/348
188/282.3
8,517,154 B2 * 8/2013 Maeda ................... F16F 9/3488
188/313
(Continued)

FOREIGN PATENT DOCUMENTS

DE    10 2011 081 792    3/2012
DE    10 2015 216 508    3/2016
(Continued)

OTHER PUBLICATIONS

Office Action dated May 27, 2022 in corresponding German Patent Application No. 11 2019 003 735.8, with English-language translation
(Continued)

*Primary Examiner* — Robert A. Siconolfi
*Assistant Examiner* — James K Hsiao
(74) *Attorney, Agent, or Firm* — Wenderoth, Lind & Ponack, L.L.P.

(57) ABSTRACT

Hydraulic fluid in a cylinder's lower chamber is introduced into a back pressure chamber through the outer periphery of an extension-side main valve during a compression stroke of a piston rod. This eliminates the necessity of forming paths by arranging a plurality of discs and a check valve, the paths for introducing into the back pressure chamber the hydraulic fluid in the cylinder's lower chamber that becomes an upstream chamber during the compression stroke. This makes it possible to decrease the axial length of a shaft (Continued)

portion of the piston rod and therefore the entire length of a cylinder, and also downsize a shock absorber.

7 Claims, 5 Drawing Sheets

(51) Int. Cl.
*B60G 13/08* (2006.01)
*B60G 17/08* (2006.01)
*F16F 9/348* (2006.01)
*F16F 9/512* (2006.01)
*F16F 9/06* (2006.01)

(52) U.S. Cl.
CPC .......... *B60G 17/08* (2013.01); *B60G 2202/24* (2013.01); *B60G 2204/62* (2013.01); *B60G 2206/41* (2013.01); *B60G 2500/114* (2013.01); *B60G 2800/162* (2013.01); *F16F 9/061* (2013.01); *F16F 2222/12* (2013.01); *F16F 2228/066* (2013.01); *F16F 2232/08* (2013.01); *F16F 2234/02* (2013.01)

(58) Field of Classification Search
CPC ............. F16F 2228/066; F16F 2232/08; F16F 2234/02; B60G 13/08; B60G 17/08; B60G 2202/24; B60G 2206/41; B60G 2500/114; B60G 2800/162

See application file for complete search history.

(56) References Cited

U.S. PATENT DOCUMENTS

| | | | | |
|---|---|---|---|---|
| 9,309,947 | B2* | 4/2016 | Kitagawa | B29C 45/1459 |
| 9,500,256 | B2* | 11/2016 | Yamashita | F16F 9/585 |
| 9,868,331 | B2* | 1/2018 | Yamashita | F16F 9/50 |
| 2005/0279597 | A1* | 12/2005 | Yamaguchi | F16F 9/348 |
| | | | | 188/322.13 |
| 2011/0209956 | A1* | 9/2011 | Maeda | F16F 9/369 |
| | | | | 188/322.13 |
| 2012/0048666 | A1 | 3/2012 | Murakami | |
| 2016/0061284 | A1 | 3/2016 | Yamashita | |
| 2017/0080767 | A1* | 3/2017 | Yamashita | F16F 9/182 |

FOREIGN PATENT DOCUMENTS

| | | |
|---|---|---|
| DE | 11 2014 005 430 | 8/2016 |
| JP | 2005-344911 | 12/2005 |
| KR | 10 2012 0087669 | 8/2012 |

OTHER PUBLICATIONS

International Search Report dated Aug. 13, 2019 in International Application No. PCT/JP2019/028226 with English translation.
Written Opinion of the International Searching Authority dated Aug. 13, 2019 in International Application No. PCT/JP2019/028226 with English translation.

* cited by examiner

SHOCK ABSORBER

TECHNICAL FIELD

The invention relates to a shock absorber that controls a hydraulic fluid flow produced by strokes of a piston rod and thus generates a damping force.

BACKGROUND ART

Patent Literature 1 discloses a hydraulic shock absorber in which, during a compression stroke of a piston rod, a check valve is opened to introduce pressure of a cylinder's lower chamber into a back pressure chamber of an extension-side main valve. The shock absorber thus prevents a damping force from being released when the extension-side main valve is opened by the pressure of the cylinder's lower chamber during the compression stroke.

CITATION LIST

Patent Literature

PTL 1: Japanese Unexamined Patent Application Publication (Kokai) No. 2005-344911

SUMMARY OF INVENTION

Technical Problem

The shock absorber disclosed in Patent Literature 1 introduces the hydraulic oil of an upstream chamber into the back pressure chamber during a reverse stroke, so that paths (channels) are formed by arranging a plurality of discs and a check valve. In such a case, the cylinder needs to be large in axial length (entire length), and the shock absorber is accordingly increased in size.

Solution to Problem

An object of the invention is to provide a shock absorber that can be downsized.

The shock absorber according to one embodiment of the invention comprises a cylinder in which hydraulic fluid is contained in a sealed manner; a piston that is slidably fitted in the cylinder; a piston rod having a first end coupled to the piston and a second end extending outside the cylinder; a main valve configured to generate a damping force by controlling a hydraulic fluid flow from an upstream chamber to a downstream chamber which is created when the piston moves in a first direction; a back pressure chamber that is arranged in the downstream chamber and applies back pressure acting in a valve-closing direction to the main valve; a seal mechanism that moves with motion of an outer peripheral portion of the main disc when the main valve is open, and defines the back pressure chamber; and a back pressure introduction path for introducing the hydraulic fluid in the upstream chamber into the back pressure chamber. The shock absorber controls opening of the main valve using the back pressure of the back pressure chamber. When the piston moves in a second direction, the seal mechanism functions as a valve that introduces into the back pressure chamber the hydraulic fluid of the chamber that becomes a downstream chamber when the piston moves in the first direction.

The one embodiment of the invention makes it possible to downsize the shock absorber.

DESCRIPTION OF EMBODIMENTS

First Embodiment

A first embodiment of the invention will be discussed with reference to the attached drawings.

A shock absorber 1 according to the first embodiment is a single-cylinder type hydraulic shock absorber that is mounted between an unsprung (wheel) side and a sprung (vehicle body) side of a suspension device of an automobile or the like. For the convenience of discussion, a vertical direction on FIGS. 1 and 2 is referred to as a vertical direction in the shock absorber 1 according to the first embodiment.

Figure 1:
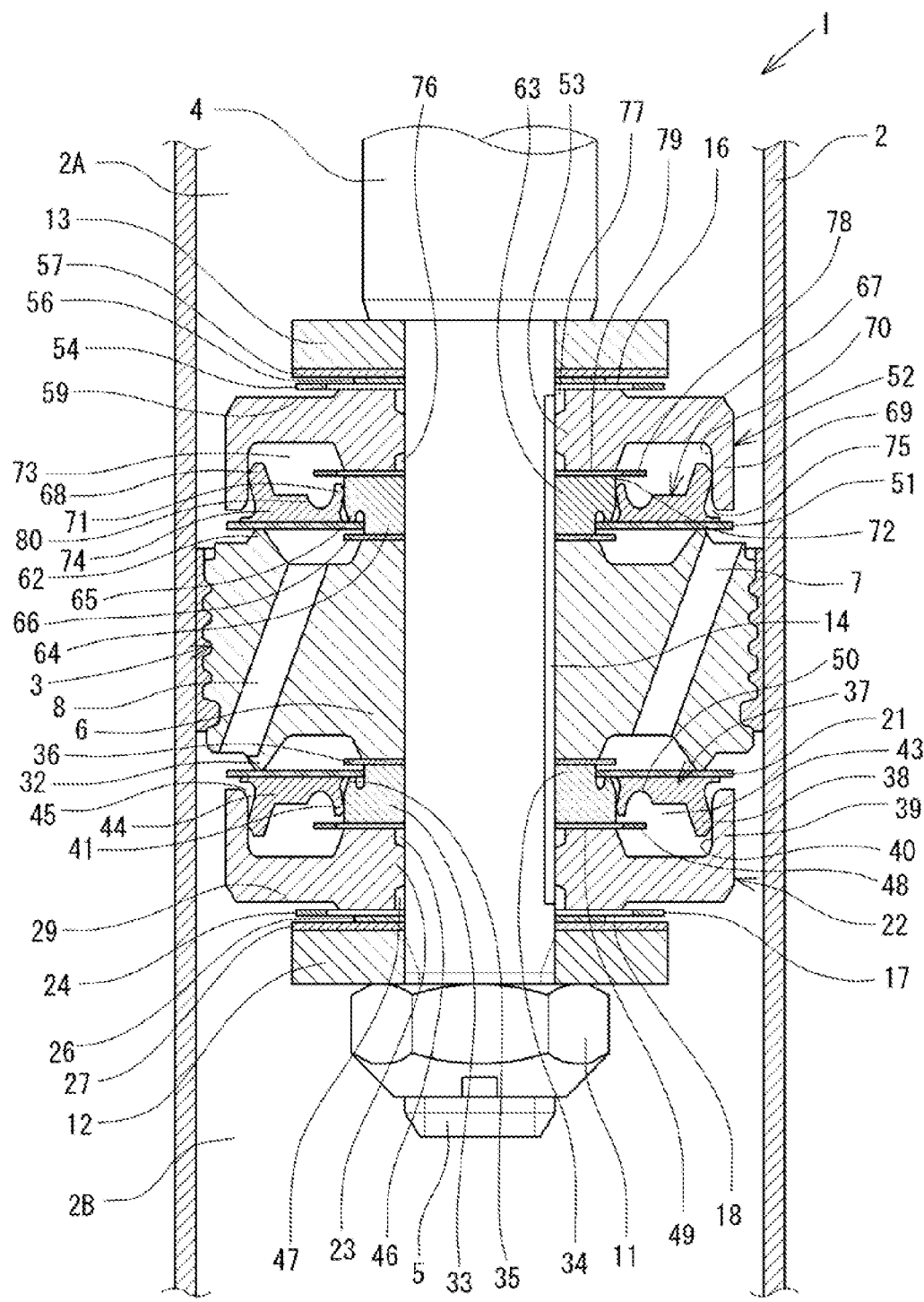
FIG. 1 is a cross-sectional view of a part of a shock absorber according to a first embodiment.
Figure 2:
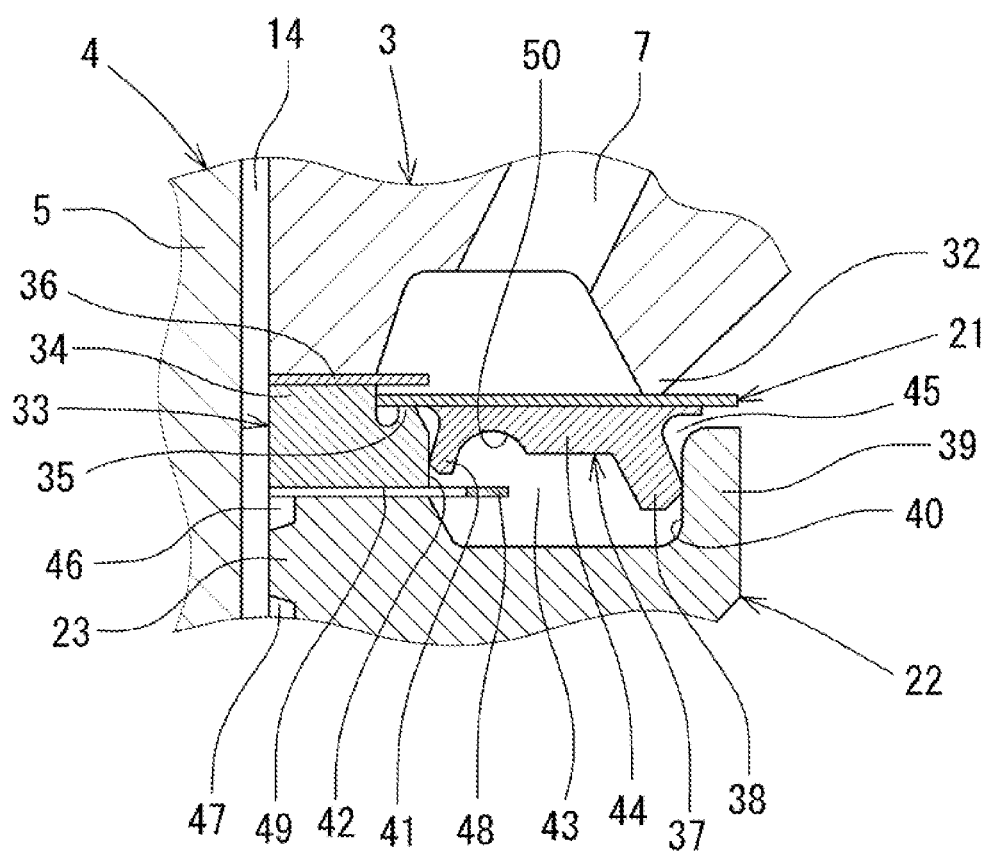
FIG. 2 is an enlarged view of a main part of FIG. 1.

Referring to FIG. 1, a piston 3 is movably (slidably) fitted inside a cylinder 2. The piston 3 divides the interior of the cylinder 2 into two chambers, namely a cylinder's upper chamber 2A and a cylinder's lower chamber 2B. Coupled to the piston 3 is a shaft portion 5 (small-diameter portion) that is a first end side of a piston rod 4. A second end side of the piston rod 4 is inserted in a rod guide and an oil seal, neither shown, which are mounted on an upper end portion of the cylinder 2. The second end side of the piston rod 4 extends out of the cylinder 2.

A free piston, not shown, is provided inside the cylinder 2. The free piston is vertically movable within the cylinder 2. The free piston divides the interior of the cylinder 2 into the cylinder's lower chamber 2B on the piston 3 side and a gas chamber, not shown, on a bottom portion side. Hydraulic oil is injected and sealed as hydraulic fluid in the cylinder's upper chamber 2A and the cylinder's lower chamber 2B. High pressure gas (nitrogen gas) is injected and sealed as hydraulic fluid in the gas chamber.

The piston 3 is provided with a plurality of extension-side paths 7 and compression-side paths 8 (FIG. 1 shows only one for each) that bring the cylinder's upper chamber 2A and the cylinder's lower chamber 2B into communication with each other. An extension-side main valve 21 is provided on a lower-end side of the piston 3. The extension-side main valve 21 is provided in the cylinder's lower chamber 2B that becomes a downstream chamber during an extension stroke. During the extension stroke, the extension-side main valve 21 controls a hydraulic oil flow from the cylinder's upper chamber 2A (upstream chamber) to the cylinder's lower chamber 2B (downstream chamber) which is created by an upward (one-way) sliding motion of the piston 3, to generate an extension-side damping force.

Further provided on the lower-end side of the piston 3 is a bottomed cylinder-like back pressure chamber forming member 22. A substantially cylindrical inner peripheral portion 23 is formed on an inner periphery side of the back pressure chamber forming member 22. The shaft portion 5 of the piston rod 4 is fitted in the inner peripheral portion 23.

The inner peripheral portion 23 is held between an inner peripheral portion 6 of the piston 3 and a washer 12 by an axial force that is generated by fastening a nut 11 mounted on the shaft portion 5 (hereinafter, the axial force will be referred to as an "axial force of the nut 11"). Further provided between the back pressure chamber forming member 22 and the washer 12 are a disc 24, a retainer 26, and a disc 27 in the order from the top. The disc 24, the retainer 26, and the disc 27 are sandwiched between the inner peripheral portion 23 of the back pressure chamber forming member 22 and the washer 12 by the axial force of the nut 11.

On an outer periphery side of the lower end portion of the piston 3, there is provided a ring-like seat portion 32. An outer peripheral portion of the extension-side main valve 21 having a disc-like shape is seated on the seat portion 32. The extension-side main valve 21 is not clamped at an inner peripheral portion and is therefore simply supported by the retainer 33 mounted on the shaft portion 5 of the piston rod 4. A small-diameter shaft portion 34 is formed in an upper end portion of the retainer 33. An inner peripheral face of the extension-side main valve 21 is slidably fitted onto the shaft portion 34. A ring-like seat portion 35 is formed in an outer peripheral side of the shaft portion 34. The seat portion 35 is in contact with a rear face (opposite face to a face that is seated on the seat portion 32 of the piston 3) of the inner peripheral portion of the extension-side main valve 21.

In other words, the inner peripheral portion of the extension-side main valve 21 is seated on the seat portion 35 of the retainer 33 and supported by the shaft portion 34 of the retainer 33 so as to be movable in the vertical direction. A disc-like regulating member 36 is provided between the shaft portion 34 of the retainer 33 and the inner peripheral portion 6 of the piston 3. The regulating member 36 regulates an upward motion of the inner peripheral portion of the extension-side main valve 21. The seat portion 35 of the retainer 33 is formed to be decreased in external diameter toward a distal end (upper end) thereof.

Referring to FIGS. 1 and 2, a ring-like packing 37 is rigidly fixed to the rear face of the extension-side main valve 21. The packing 37 functions as a seal mechanism comprising an elastic body made of rubber or the like. The packing 37 includes an outer periphery side seal portion 38 (seal mechanism) that is in slidable contact with an inner peripheral face 40 of a cylindrical portion 39 of the back pressure chamber forming member 22 and an inner periphery side seal portion 41 (blocking member) that is in slidable contact with an outer peripheral face 42 of the retainer 33. A back pressure chamber 43 of the extension-side main valve 21 is defined and formed in the inside of the back pressure chamber forming member 22. The packing 37 includes an outer periphery side seal portion 38, an inner periphery side seal portion 41, and a base portion 44 that is a base of the packing 37, which are integrally formed.

The outer periphery side seal portion 38 is a ring-like wall extending downward from the base portion 44. The outer periphery side seal portion 38 has external and internal diameters increasing downward into a substantially conical shape. Due to such a shape, the outer periphery side seal portion 38 receives the pressure of the back pressure chamber 43 to be pressed against the inner peripheral face 40 of the cylindrical portion 39 of the back pressure chamber forming member 22. During the extension stroke of the piston rod 4, the hydraulic oil in the cylinder's upper chamber 2A (upstream chamber) is introduced into the back pressure chamber 43 through an extension-side back pressure introduction path discussed later. A ring-like clearance 45 is formed between an outer peripheral portion of the packing 37 and the cylindrical portion 39 of the back pressure chamber forming member 22. The clearance 45 has a wedge-shaped cross-section along a plane including an axis of the piston rod 4 (hereinafter, the cross-section will be referred to as a "cross-section along the axial plane"). The clearance 45 opens into (communicates with) the cylinder's lower chamber 2B.

The inner periphery side seal portion 41 is a ring-like wall extending downward from the base portion 44. The inner periphery side seal portion 41 has external and internal diameters increasing downward into a substantially conical shape. Due to such a shape, the inner periphery side seal portion 41 receives the pressure of the back pressure chamber 43 to be pressed against the outer peripheral face 42 of the retainer 33. A ring-like recessed portion 50 is formed on an outer peripheral side of the inner periphery side seal portion 41. The shape (depth or the like) of the recessed portion 50 makes it possible to adjust the inner periphery side seal portion 41 in area that receives the pressure of the back pressure chambre 43.

An inner peripheral face of the inner peripheral portion 23 of the back pressure chamber forming member 22 is provided with a ring-like path 46 that opens in an upper end face of the inner peripheral portion 23 and a ring-like path 47 that opens in a lower end face of the inner peripheral portion 23. The upper path 46 and the lower path 47 are in communication with each other through a groove-like path 14 extending in the vertical direction. The path 14 is formed in an outer peripheral face of the shaft portion 5 of the piston rod 4. A disc 48 is interposed between the inner peripheral portion 23 of the back pressure chamber forming member 22 and the retainer 33. The back pressure chamber 43 is in communication with the path 14 of the shaft portion 5 through a slit-like path 49 formed in the disc 48 and the upper path 46 of the inner peripheral portion 23 of the back pressure chamber forming member 22.

The piston 3 is provided with a compression-side main valve 51 in an upper end side thereof. The compression-side main valve 51 is provided in the cylinder's upper chamber 2A that becomes the downstream chamber during a compression stroke. During the compression stroke, the compression-side main valve 51 controls a hydraulic oil flow from the cylinder's lower chamber 2B (upstream chamber) to the cylinder's upper chamber 2A (downstream chamber) which is created by the downward sliding motion of the piston 3, to thereby generate a compression-side damping force.

A back pressure chamber forming member 52 is also provided on the upper end side of the piston 3. The back pressure chamber forming member 52 is a bottomed cylinder-like case member. In an inner peripheral side of the back pressure chamber forming member 52, a substantially cylindrical inner peripheral portion 53 is formed. The shaft portion 5 of the piston rod 4 is fitted in the inner peripheral portion 53. The inner peripheral portion 53 is held between the inner peripheral portion 6 of the piston 3 and a washer 13 by the axial force of the nut 11. Provided between the back pressure chamber forming member 52 and the washer 13 are a disc 54, a retainer 56, and a disc 57 in the order from the bottom. The disc 54, the retainer 56, and the disc 57 are sandwiched between the inner peripheral portion 53 of the back pressure chamber forming member 52 and the washer 13 by the axial force of the nut 11.

A ring-like seat portion 62 is provided in an outer peripheral side of an upper end portion of the piston 3. The outer peripheral portion of the compression-side main valve 51 having a disc-like shape is seated on the seat portion 62. The compression-side main valve 51 is not clamped at an inner peripheral portion thereof and is simply supported by a retainer 63 mounted on the shaft portion 5 of the piston rod 4. The retainer 63 has a lower end portion in which a small-diameter shaft portion 64 is formed. An inner peripheral face of the compression-side main valve 51 is slidably fitted onto the shaft portion 64. A ring-like seat portion 65 is formed in an outer peripheral side of the shaft portion 64. The seat portion 65 is in contact with a rear face (opposite face to a face on which the seat portion 62 of the piston 3 is seated) of the inner peripheral portion of the compression-side main valve 51.

In other words, the inner peripheral portion of the compression-side main valve 51 is seated on the seat portion 65 of the retainer 63 and supported by the shaft portion 64 of the retainer 63 to be movable in the vertical direction. A disc-like regulating member 66 is provided between the shaft portion 64 of the retainer 63 and the inner peripheral portion 6 of the piston 3. The regulating member 66 regulates a downward motion of the inner peripheral portion of the compression-side main valve 51. The seat portion 65 of the retainer 63 is formed to be decreased in external diameter toward a distal end (lower end) thereof.

A ring-like packing 67 is rigidly fixed to a rear face of the compression-side main valve 51. The packing 67 comprises an elastic body made of rubber or the like. The packing 67 includes an outer periphery side seal portion 68 that is in slidable contact with an inner peripheral face 70 of a cylindrical portion 69 of the back pressure chambre forming member 52 and an inner periphery side seal portion 71 (blocking member) that is in slidable contact with an outer peripheral face 72 of the retailer 63. This forms a back pressure chamber 73 of the compression-side main valve 51 in the inside of the back pressure chamber forming member 52. The packing 67 includes the outer periphery side seal portion 68, the inner periphery side seal portion 71, and a base portion 74 that is a base of the packing 67, which are integrally formed. According to the present embodiment, the inner periphery side seal portion 71 (blocking member) is rigidly fixed to the rear face of the compression-side main valve 51. The inner periphery side seal portion 71 instead may be so configured, for example, that an O-ring is arranged between the retainer 63 and the compression-side main valve 51 or that a seal is rigidly fixed to the inner peripheral side of the compression-side main valve 51 to stretch between front and rear faces of the compression-side main valve 51.

The outer periphery side seal portion 68 is a ring-like wall extending upward from the base portion 74. The outer periphery side seal portion 68 has external and internal diameters increasing upward into a substantially conical shape. Due to such a shape, the outer periphery side seal portion 68 receives the pressure of the back pressure chamber 73 to be pressed against the inner peripheral face 70 of the cylindrical portion 69 of the back pressure chamber forming member 52. During the compression stroke of the piston rod 4, the hydraulic oil in the cylinder's lower chamber 2B (upstream chamber) is introduced into the back pressure chamber 73 through a compression-side back pressure introduction path discussed later. A ring-like clearance 75 is formed between an outer peripheral portion of the packing 67 and the cylindrical portion 69 of the back pressure chamber forming member 52. The clearance 75 has a wedge-shaped cross-section along the axial plane. The clearance 75 opens into (communicates with) the cylinder's upper chamber 2A.

The inner periphery side seal portion 71 is a ring-like wall extending upward from the base portion 74. The inner periphery side seal portion 71 has external and internal diameters increasing upward into a substantially conical shape. Due to such a shape, the inner periphery side seal portion 71 receives the pressure of the back pressure chamber 73 to be pressed against the outer peripheral face 72 of the retainer 63. A ring-like recessed portion 80 is formed in an outer peripheral side of the inner periphery side seal portion 71. The shape (depth or the like) of the recessed portion 80 makes it possible to adjust the inner periphery side seal portion 71 in area that receives the pressure of the back pressure chamber 73.

A ring-like path 76 and a ring-like path 77 are provided in an inner peripheral face of the inner peripheral portion 53 of the back pressure chamber forming member 52. The path 76 opens in a lower end face of the inner peripheral portion 53, and the path 77 opens in an upper end face of the inner peripheral portion 53. The lower path 76 and the upper path 77 are in communication with each other through the path 14 formed in the outer peripheral face of the shaft portion 5 of the piston rod 4. A disc 78 is interposed between the inner peripheral portion 53 of the back pressure chamber forming member 52 and the retainer 63. The back pressure chamber 73 is in communication with the path 14 of the shaft portion 5 through a slit-like path 79 formed in the disc 78 and the lower path 76 of the inner peripheral portion 53 of the back pressure chamber forming member 52.

During the extension stroke of the piston rod 4, as the piston 3 moves upward, the hydraulic oil in the cylinder's upper chamber 2A (upstream chamber) is introduced into the back pressure chamber 43 of the extension-side main valve 21 through the extension-side back pressure introduction path comprising a path 16 formed in an inner peripheral side of the disc 54, the path 77 formed in the back pressure chamber forming member 52, the path 14 formed in the shaft portion 5 of the piston rod 4, and the path 49 formed in the disc 48.

During the compression stroke of the piston rod 4, as the piston 3 moves downward, the hydraulic oil in the cylinder's lower chamber 2B (upstream chamber) is introduced into the back pressure chamber 73 of the compression-side main valve 51 through the compression-side back pressure introduction path comprising a path 18 formed in an inner peripheral side of the disc 24, the path 47 formed in the back pressure chamber forming member 22, the path 14 formed in the shaft portion 5 of the piston rod 4, and the path 79 formed in the disc 78.

The following discussion is about operation of the first embodiment.

During the extension stroke of the piston rod 4, the damping force is generated by controlling the hydraulic oil flow from the cylinder's upper chamber 2A (upstream chamber) to the cylinder's lower chamber 2B (downstream chamber) which is created by the sliding motion (upward motion) of the piston 3 within the cylinder 2. During the extension stroke, the hydraulic oil (pressure) in the cylinder's upper chamber 2A is introduced into the back pressure chamber 43 of the extension-side main valve 21 through the extension-side back pressure introduction path.

In an extremely low speed area where the piston 3 vertically moves at an extremely low speed in the extension stroke (hereinafter, the vertical speed will be referred to as "piston speed"), the hydraulic oil in the cylinder's upper chamber 2A flows into the cylinder's lower chamber 2B through the path 16 formed in the inner peripheral side of the disc 54, the path 77 formed in the inner peripheral side 53 of the back pressure chamber forming member 52, the path 14 formed in the shaft portion 5 of the piston rod 4, the path 47 formed in the inner peripheral portion 23 of the back pressure chamber forming member 22, and the path 18 formed in the inner peripheral side of the disc 24, thereby generating a damping force with orifice characteristics.

When the extension-side main valve 21 is opened by an increase in piston speed, a damping force with valve characteristics corresponding to an opening degree of the extension-side main valve 21 is generated.

According to the first embodiment, during the compression stroke of the piston rod 4 that is a reverse stroke, the outer periphery side seal portion 38 (seal mechanism) of the packing 37 receives the pressure of the cylinder's lower chamber 2B to bend or deflect (lean) toward the inner periphery side and comes out of contact (separatable or selectively away from and into contact with). Consequently, the hydraulic oil (pressure) of the cylinder's lower chamber 2B is introduced into the back pressure chamber 43. The outer periphery side seal portion 38 thus functions as a check valve. A force acting onto the extension-side main valve 21 in a valve-closing direction then becomes larger than a force acting onto the extension-side main valve 21 in a valve-opening direction. It is therefore possible to repress the opening of the extension-side main valve 21 during the reverse stroke and obtain a stable damping force.

During the compression stroke of the piston rod 4 which is the reverse stroke, the hydraulic oil (pressure) in the cylinder's lower chamber 2B is introduced into the back pressure chamber 43 through an outer periphery of the extension-side main valve 21. The inner periphery side seal portion 41 (blocking member) of the packing 37 receives the pressure of the back pressure chamber 43 to be pressed against the outer peripheral face 42 of the retainer 33. This inhibits the hydraulic oil (pressure) introduced into the back pressure chamber 43 during the compression stroke (reverse stroke) from flowing into the extension-side path 7 through a gap between the inner peripheral portion of the extension-side main valve 21 simply supported and the retainer 33 and prevents the damping force from being released by the hydraulic oil flowing into the cylinder's upper chamber 2A.

During the compression stroke of the piston rod 4, the damping force is generated by controlling the hydraulic oil flow from the cylinder's lower chamber 2B (upstream chamber) to the cylinder's upper chamber 2A (downstream chamber) which is created by the sliding motion (downward motion) of the piston 3 within the cylinder 2. During the compression stroke, the hydraulic oil (pressure) in the cylinder's lower chamber 2B is introduced into the back pressure chamber 73 of the compression-side main valve 51 through the compression-side back pressure introduction path mentioned above.

In an extremely low speed area where the piston 3 moves at an extremely low speed in the compression stroke, the hydraulic oil in the cylinder's lower chamber 2B flows into the cylinder's upper chamber 2A through the path 18 formed in the inner peripheral side of the disc 24, the path 47 formed in the inner peripheral portion 23 of the back pressure chamber forming member 22, the path 14 formed in the shaft portion 5 of the piston rod 4, the path 77 formed in the inner peripheral side 53 of the back pressure chamber forming member 52, and the path 16 formed in the inner peripheral side of the disc 54, thereby generating a damping force with orifice characteristics.

When the compression-side main valve 51 is opened by an increase in piston speed, a damping force with valve characteristics corresponding to an opening degree of the compression-side main valve 51 is generated.

According to the first embodiment, during the extension stroke of the piston rod 4 that is the reverse stroke, the outer periphery side seal portion 68 (movable member) of the packing 67 receives the pressure of the cylinder's upper chamber 2A to bend or deflect (lean) toward the inner periphery side, and the hydraulic oil (pressure) in the cylinder's upper chamber 2A is then introduced into the back pressure chamber 73. Accordingly, a force acting onto the compression-side main valve 51 in a valve-closing direction becomes larger than a force acting onto the compression-side main valve 51 in a valve-opening direction. It is therefore possible to repress the opening of the compression-side main valve 51 during the reverse stroke and obtain a stable damping force.

During the extension stroke of the piston rod 4 which is the reverse stroke, the hydraulic oil (pressure) in the cylinder's upper chamber 2A is introduced into the back pressure chamber 73 through an outer periphery of the compression-side main valve 51, and the inner periphery side seal portion 71 (blocking member) of the packing 67 receives the pressure of the back pressure chamber 73 to be pressed against the outer peripheral face 72 of the retainer 63. This inhibits the hydraulic oil (pressure) introduced into the back pressure chamber 73 during the extension stroke (reverse stroke) from flowing into a compression-side path 8 through a gap between the inner peripheral portion of the compression-side main valve 51 simply supported and the retainer 63 and prevents the damping force from being released by the hydraulic oil flowing into the cylinder's lower chamber 2B.

As disclosed in the Patent Literature 1, if paths (channels) are formed by arranging a plurality of discs and a check valve to introduce hydraulic oil of an upper chamber into a back pressure chamber during a reverse stroke, an axial length of the shaft portion of a piston rod and therefore the entire length of a cylinder is increased, and the shock absorber is accordingly increased in size.

In contrast, according to the first embodiment, the hydraulic fluid in the chambers 2B and 2A that become the upstream chambers during the reverse stroke of the piston rod 4 is introduced into the back pressure chambers 43 and 73 through the outer peripheries of the main valves 21 and 51. This eliminates the necessity of forming the paths (channels) by arranging the plurality of discs and the check valve, the paths for introducing into the back pressure chambers 43 and 73 the hydraulic fluid of the chambers 2B and 2A that become the upstream chambers during the reverse stroke. This makes it possible to decrease the axial length of the shaft portion 5 of the piston rod 4 and therefore the entire length of the cylinder 2, and also downsize the shock absorber 1.

The first embodiment provides the following advantageous effects.

According to the first embodiment, a shock damper comprises a cylinder in which hydraulic fluid is contained in a sealed manner; a piston that is slidably fitted in the cylinder; a piston rod having a first end coupled to the piston and a second end extending outside the cylinder; a main valve configured to generate a damping force by controlling a hydraulic fluid flow from an upstream chamber to a downstream chamber which is created when the piston moves in a first direction; a back pressure chamber that is arranged in the downstream chamber and applies back pressure acting in a valve-closing direction onto the main valve; a seal mechanism that moves with motion of an outer peripheral portion of the main disc when the main valve is open, and thus defines the back pressure chamber; and a back pressure introduction path for introducing the hydraulic fluid of the upstream chamber into the back pressure chamber. The shock absorber controls opening of the main valve using the back pressure of the back pressure chamber. When the piston moves in a second direction, the seal mechanism functions as a valve that introduces into the back pressure chamber the hydraulic fluid in the chamber that becomes a downstream chamber when the piston moves in the first direction and therefore introduces into the back pressure chamber the hydraulic fluid in the chamber that becomes an upstream chamber during a reverse stroke of the piston rod. This eliminates the necessity of forming the paths (channels) by arranging a plurality of discs and a check valve and makes it possible to reduce the cylinder in axial length (entire length) and downsize the shock damper.

If the inner peripheral portion of the main valve is clamped as disclosed in the Patent Literature 1, the disc forming the main valve is increased in bending rigidity, which makes it difficult to decrease the damping force on the soft side. The first embodiment, however, includes a simple (cantilever) support structure in which the main valve is not clamped at the inner peripheral side, so that the main valve can be opened at lower piston speed. This makes it possible to set the soft-side damping force to a smaller value and thus improve a ride quality of a vehicle. If the soft-side damping force to be generated is the same, it is possible to use a main valve with a smaller external diameter, as compared to the main valve that is clamped at the inner peripheral portion. This makes it possible to decrease the cylinder in external diameter and downsize the shock damper.

According to the first embodiment, a blocking member is provided in the inner peripheral side of the main valve to block the hydraulic fluid from flowing into the upstream chamber during the reverse stroke where the piston slides in the second direction. This inhibits the hydraulic fluid in the back pressure chamber from flowing into the upstream chamber through an inner periphery side of the main valve simply supported and prevents the damping force from being released.

According to the first embodiment, a movable member is a packing that is integrally provided in an outer periphery of the main valve. This reduces the number of components and thus the number of assembling steps. According to the first embodiment, the movable member and the blocking member are respectively formed on outer and inner peripheral sides of the packing. Furthermore, the main valve, the movable member, and the blocking member are integrally formed. It is therefore possible to prevent the number of components from being increased by providing the blocking member.

The movable member and the blocking member do not necessarily have to be formed on the outer and inner peripheral sides of one packing. The movable member and the blocking member may be separately provided in such a manner that a movable member comprising a packing is provided in the outer peripheral side of the main valve and that a blocking member comprising a packing is provided in the inner peripheral side of the main valve.

The blocking member may be, for example, an O-ring or the like, instead of a packing.

Although the first embodiment relates to the case where the invention is applied to the single cylinder-type hydraulic shock absorber, the invention is applicable to a multi-cylinder type hydraulic shock absorber in which a reservoir is formed between the cylinder 2 and an outer tube. In such a case, a free piston is not necessary, and a base valve is arranged between the cylinder's lower chamber 2B and the reservoir. To provide a plurality of cylinders makes it possible to further decrease the axial length of the cylinder 2.

Second Embodiment

Figure 3:
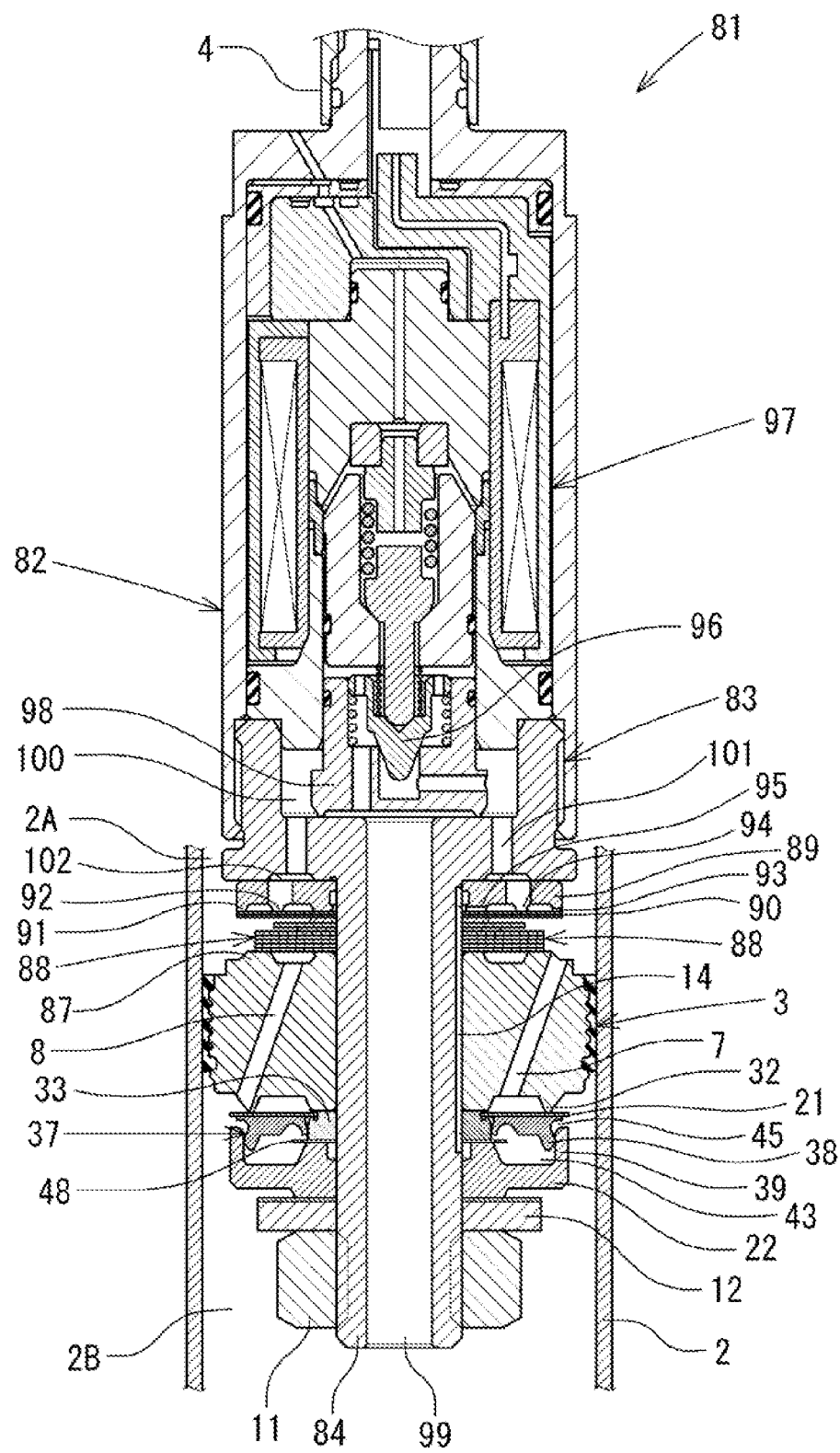
FIG. 3 is a cross-sectional view of a part of a shock absorber according to a second embodiment.
Figure 4:
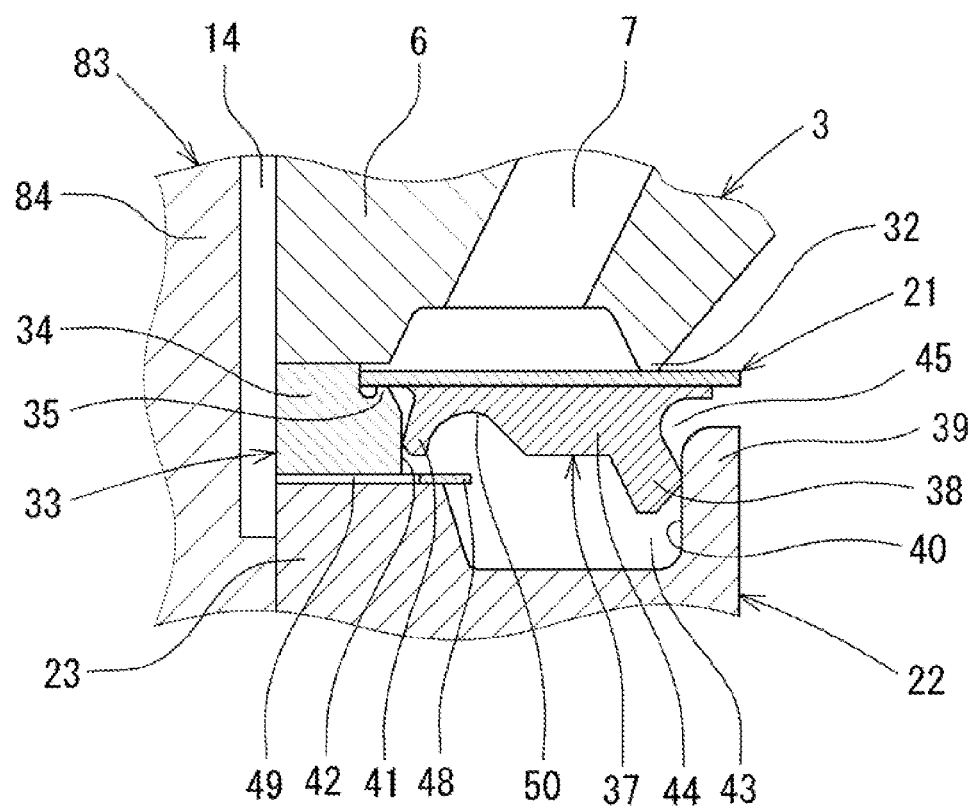
FIG. 4 is an enlarged view of a main part of FIG. 3.

A second embodiment will be now discussed with reference to FIGS. 3 and 4. The following discussion relates chiefly to differences from the first embodiment. Similar names and reference marks designate common parts with the first embodiment, and repetitive descriptions will be omitted.

The shock absorber 1 according to the first embodiment is a so-called conventional suspension damper with a single damping force characteristic relative to piston speed. A shock absorber 81 according to the second embodiment is a so-called semiactive suspension damper that includes a damping force variable mechanism 82. In this description, the shock absorber 81 according to the second embodiment which includes the damping force variable mechanism 82 is similar to a conventional semiactive suspension damper in basic structure. Therefore, the basic structure of the semi-active suspension damper will not be described in detail.

An extension-side main valve 21 of the second embodiment is simply supported by a retainer 33 that is mounted on a shaft portion 84 of a piston case 83. A packing 37 is rigidly fixed to a rear face of the extension-side main valve 21. The packing 37 includes an outer periphery side seal portion 38 that is in slidable contact with an inner peripheral face 40 of a cylindrical portion 39 of a back pressure chamber forming member 22. The packing 37 further includes an inner periphery side seal portion 41 that is in slidable contact with an outer peripheral face 42 of the retainer 33. Accordingly, a ring-like back pressure chamber 43 is formed in the inside of the back pressure chamber forming member 22. In the first embodiment, the motion of the extension-side main valve 21 is regulated by the regulating member 36 provided between the shaft portion 34 of the retainer 33 and the inner peripheral portion 6 of the piston 3. The second embodiment instead regulates the motion of the extension-side main valve 21 by the inner peripheral portion 6 of the piston 3.

The piston 3 is provided with a ring-like seat portion 87 in an upper end portion thereof. Seated on the seat portion 87 is a disc valve 88 comprising a plurality of discs. A ring-like valve member 89 is mounted on an upper end portion of the shaft portion 84 of the piston case 83. A disc valve 90 mounted on the shaft portion 84 of the piston case 83 is provided in a lower end portion of the valve member 89. The disc valve 90 is seated on a ring-like seat portion 91 provided in an outer peripheral edge portion of the lower end portion of the valve member 49 and a ring-like seat portion 92 provided in an inner periphery side relative to the seat portion 91.

During an extension stroke of a piston rod 4, the piston 3 moves (slides) upward. Along with this motion of the piston 3, the hydraulic oil in a cylinder's upper chamber 2A (upstream chamber) is introduced into the back pressure chamber 43 of the extension-side main valve 21 through an extension-side back pressure introduction path comprising an orifice 93 formed in the seat portion 91 located on an outer periphery side of the valve member 89, a path 94 formed in the seat portion 92 located on an inner periphery side of the valve member 89, a path 95 formed in a lower end portion of an inner peripheral portion of the valve member 89, a path 14 formed in the shaft portion 8 of the piston case 83, and a path 49 formed in a disc 48.

Operation of the second embodiment will be now discussed.

During the extension stroke of the piston rod 4, when hydraulic oil (hydraulic fluid) on the cylinder's upper chamber 2A side is pressurized by the sliding motion of the piston 3 within a cylinder 2, the hydraulic oil in the cylinder's upper chamber 2A (upstream chamber) is introduced into the back pressure chamber 43 through the extension-side back pressure introduction path mentioned above while a valve body 96 is closed. The extension-side main valve 21 then can be adjusted in set load (valve-opening pressure) by controlling a thrust (control current) of a solenoid 97 to vary the pressure of the back pressure chamber 43, that is, the back pressure of the extension-side main valve 21.

During a compression stroke, hydraulic oil (hydraulic fluid) on a cylinder's lower chamber 2B side is pressurized by the sliding motion of the piston 3 within the cylinder 2. The hydraulic oil in the cylinder's lower chamber 2B then passes through a compression-side path 20 and opens the disc valve 88 to flow into the cylinder's upper chamber 2A. At this moment, a damping force with valve characteristics of the disc valve 88 is obtained. During the compression stroke, the valve body 98 is opened against the thrust of the solenoid 97 by controlling the thrust (control current) of the solenoid 97 to vary a set load (valve-opening pressure) of a valve body 98. The hydraulic oil in the cylinder's lower chamber 2B then passes through a path 99, a chamber 100, a path 101, and a ring-like path 102. The hydraulic oil further opens the disc valve 90 in which the path 94 (back pressure chamber introduction path) is formed, to thereby flow into the cylinder's upper chamber 2A. At this moment, a damping force with valve characteristics of the disc valve 90 is obtained.

The second embodiment provides similar operation and advantageous effects to the first embodiment.

Third Embodiment

Figure 5:
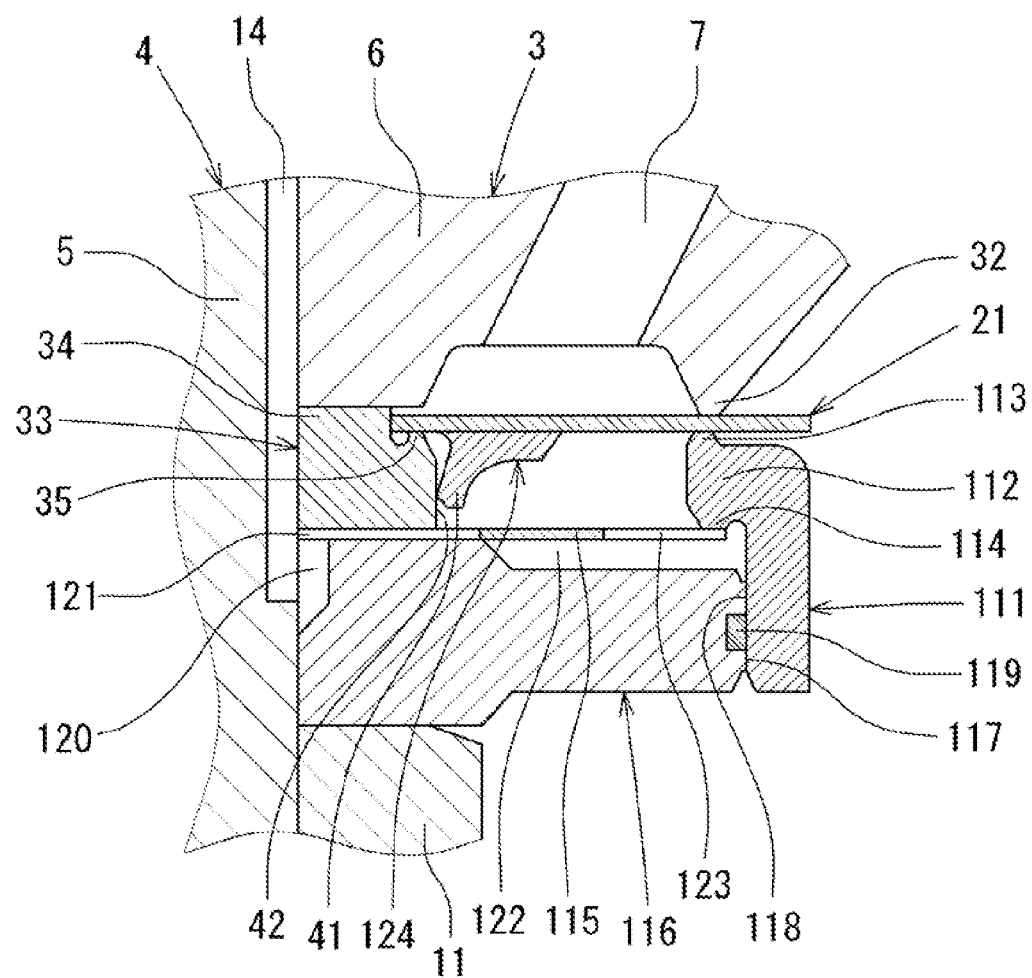
FIG. 5 is an explanatory view of a third embodiment and corresponds to FIG. 2 showing the first embodiment.

A third embodiment will be now discussed with reference to FIG. 5. The following discussion relates chiefly to differences from the first embodiment. Similar names and reference marks designate common parts with the first embodiment, and repetitive descriptions will be omitted.

In the first embodiment, the outer periphery side seal portion 38 (seal mechanism) of the packing 37 is brought into slidable contact with the inner peripheral face 40 of the cylindrical portion 39 of the back pressure chamber forming member 22, to thereby form the back pressure chamber 43 of the extension-side main valve 21. In contrast, according to the third embodiment, a valve seat 111 (seal mechanism) as a cylinder-like cylindrical member is brought into contact with a rear face (opposite face to a face on which a seat portion 32 of a piston 3 is seated) of an outer peripheral portion of an extension-side main valve 21, to thereby form a back pressure chamber 43 of the extension-side main valve 21.

A protruding portion 112 that protrudes toward an inner periphery is provided in an upper end portion of the valve seat 111. A ring-like seat portion 113 is formed in an upper face of an inner peripheral portion of the protruding portion 112. The seat portion 113 is opposite from the seat portion 32 of the piston 3. Formed in a lower face of the inner peripheral portion of the protruding portion 112 is a ring-like seat portion 114. The seat portion 114 of the valve seat 111 is seated on an outer peripheral edge portion of a disc 115 having elasticity. Due to the elasticity of the disc 115, the valve seat 111 is biased upward, and the seat portion 113 is pressed against the extension-side main valve 21. The disc 115 includes an inner peripheral portion that is sandwiched between a retainer 33 and an inner peripheral portion of a back pressure chamber forming member 116 (cylindrical member) as a ring-like clamped circular plate.

The back pressure chamber forming member 116 is mounted on a shaft portion 5 of a piston rod 4 due to an axial force of a nut 11. The valve seat 111 includes an inner peripheral face 118 that is brought into slidable contact with an outer periphery side end face 117 of the back pressure chamber forming member 116. A gap between the outer periphery side end face 117 of the back pressure chamber forming member 116 and the inner peripheral face 118 of the valve seat 111 is liquid-tightly sealed by a ring-like seal portion 119 provided to the outer periphery side end face 117 of the back pressure chamber forming member 116.

During an extension stroke of the piston rod 4, hydraulic oil in a cylinder's upper chamber 2A (upstream chamber) is introduced into the back pressure chamber 43 through a back pressure introduction path including a path 14 formed in the shaft portion 5 of the piston rod 4, a ring-like path 120 formed in an inner peripheral face of the back pressure chamber forming member 116, and a path 121 (cutout) formed in the inner peripheral portion of the disc 115. Formed between the disc 115 and the back pressure chamber forming member 116 is a ring-like chamber 122. The chamber 122 and the back pressure chamber 43 are in communication with each other through a path 123 (cutout) formed in an outer peripheral portion of the disc 115.

Operation of the third embodiment will be discussed below.

During the extension stroke of the piston rod 4, the hydraulic oil (pressure) in the cylinder's upper chamber 2A is introduced into the back pressure chamber 43 of the extension-side main valve 21 through the extension-side back pressure introduction path mentioned above. When the extension-side main valve 21 is opened by an increase in piston speed, a damping force with valve characteristics corresponding to an opening degree of the extension-side main valve 21 is generated.

During a compression stroke of the piston rod 4 which is a reverse stroke, the valve seat 111 (seal mechanism) receives pressure of a cylinder's lower chamber 2B and moves (slides) downward. The seat portion 113 of the valve seat 111 is then separated from the extension-side main valve 21, which introduces the hydraulic oil (pressure) in the cylinder's lower chamber 2B into the back pressure chamber 43 through an outer periphery of the extension-side main valve 21. Accordingly, a force acing on the extension-side main valve 21 in a valve-closing direction becomes larger than a force acting on the extension-side main valve 21 in a valve-opening direction. This makes it possible to repress the opening of the extension-side main valve 21 during the reverse stroke and obtain a stable damping force.

During the compression stroke of the piston rod 4 which is the reverse stroke, the hydraulic oil (pressure) in the cylinder's lower chamber 2B is introduced into the back pressure chamber 43 through the outer periphery of the extension-side main valve 21. A packing 124 (blocking member) then receives the pressure of the back pressure chamber 43 to be pressed against an outer peripheral face 42 of the retainer 33. This inhibits the hydraulic oil (pressure) introduced into the back pressure chamber 43 during the compression stroke (reverse stroke) from flowing into extension-side paths 7 through a gap between an inner peripheral portion of the extension-side main valve 21 simply supported and the retainer 33 and prevents the damping force from being released by the hydraulic oil flowing into the cylinder's upper chamber 2A.

The third embodiment provides the same operation and advantageous effects as the first embodiment.

The invention is not limited to the embodiments discussed above and may be modified in various ways. For example, the embodiments are discussed in detail to facilitate the understanding of the invention and therefore do not necessarily have to include all the constitutions mentioned above. It is possible to partially replace the constitution of one of the embodiments with the constitution of another embodiment and also to add the constitution of one of the embodiments to the constitution of another embodiment. Part of the constitution of each embodiment may be added, deleted or replaced to, from or with another constitution.

This application claims priority to Japanese patent application No. 2018-139411 filed on Jul. 25, 2018. The entire disclosure including the specification, the claims, the drawings, and the abstract of Japanese patent application No. 2018-139411 filed on Jul. 25, 2018 is incorporated herein by reference.

REFERENCE SIGN LIST

1: Shock absorber
2: Cylinder
2A: Cylinder's upper chamber
2B: Cylinder's lower chamber
3: Piston
4: Piston rod
21: Extension-side main valve
43: Back pressure chamber
68: Outer periphery side seal portion (seal mechanism)

The invention claimed is:
1. A shock absorber comprising:
a cylinder in which hydraulic fluid is contained in a sealed manner;
a piston that is slidably fitted in the cylinder;
a piston rod having a first end coupled to the piston and a second end extending outside the cylinder;
a main valve configured to generate a damping force by controlling a hydraulic fluid flow from an upstream chamber to a downstream chamber which is created when the piston moves in a first direction;
a back pressure chamber that is arranged in the downstream chamber and applies a back pressure acting onto the main valve in a valve-closing direction;
a seal mechanism that moves with motion of an outer peripheral portion of the main valve when the main valve is open, and defines the back pressure chamber; and
a back pressure introduction path for introducing the hydraulic fluid of the upstream chamber into the back pressure chamber,
wherein opening of the main valve is controlled by the back pressure of the back pressure chamber, and
the seal mechanism is configured to function as a valve that introduces into the back pressure chamber the hydraulic fluid in the chamber that becomes a downstream chamber when the piston moves in the first direction, when the piston moves in a second direction,
wherein the main valve is supported with an inner peripheral side not clamped, and
wherein the inner peripheral side of the main valve is provided with a blocking member that blocks a hydraulic fluid flow from the back pressure chamber into the upstream chamber which is created when the piston moves in the second direction.

2. The shock absorber according to claim 1, wherein the seal mechanism is a flexible packing that is integrally provided to an outer periphery of the main valve.

3. The shock absorber according to claim 2, wherein the shock absorber includes a bottomed cylinder-like case member that forms the back pressure chamber, and wherein the packing is provided to be capable of coming in and out of contact with a cylindrical portion of the case member.

4. The shock absorber according to claim 1, wherein the blocking member is a packing that is integrally provided in the inner peripheral side of the main valve.

5. The shock absorber according to claim 4, wherein a ring-like recessed portion is formed in an outer peripheral side of the blocking member.

6. The shock absorber according to claim 1, wherein a ring-like recessed portion is formed in an outer peripheral side of the blocking member.

7. A shock absorber comprising:
a cylinder in which hydraulic fluid is contained in a sealed manner;
a piston that is slidably fitted in the cylinder;
a piston rod having a first end coupled to the piston and a second end extending outside the cylinder;
a main valve configured to generate a damping force by controlling a hydraulic fluid flow from an upstream chamber to a downstream chamber which is created when the piston moves in a first direction;
a back pressure chamber that is arranged in the downstream chamber and applies a back pressure acting onto the main valve in a valve-closing direction;
a seal mechanism that moves with motion of an outer peripheral portion of the main valve when the main valve is open, and defines the back pressure chamber; and
a back pressure introduction path for introducing the hydraulic fluid of the upstream chamber into the back pressure chamber,
wherein opening of the main valve is controlled by the back pressure of the back pressure chamber, and
the seal mechanism is configured to function as a valve that introduces into the back pressure chamber the hydraulic fluid in the chamber that becomes a downstream chamber when the piston moves in the first direction, when the piston moves in a second direction,
wherein the seal mechanism comprises a cylindrical member that is capable of coming in and out of contact with the main valve, and
wherein the back pressure chamber is defined by the seal mechanism and a clamped circular plate that is provided to be slidable against an inner peripheral side of the cylindrical member.

* * * * *